(12) United States Patent
Neumann et al.

(10) Patent No.: US 7,882,897 B2
(45) Date of Patent: Feb. 8, 2011

(54) DEVICE FOR LIMITING THE ULTIMATE CONSEQUENCES OF A FAILURE TO BRING UNDER CONTROL A MASS FIRE IN A STORAGE BIN FOR HAZARDOUS MATERIALS

(75) Inventors: Mathieu Neumann, Rognes (FR); Thierry Delaforge, Pertuis (FR); Dominique Bois, Manosque (FR)

(73) Assignee: Commissariat a l'energie atomique etaux energies alternatives, Leblac Baltiment Le Ponant (*) Notice: Subject to any disclaimer, the term of this patent is extended or adjusted under 35 U.S.C. 154(b) by 740 days.

(21) Appl. No.: 11/793,087

(22) PCT Filed: Dec. 15, 2005

(86) PCT No.: PCT/FR2005/051091
§ 371 (c)(1),
(2), (4) Date: Jun. 15, 2007

(87) PCT Pub. No.: WO2006/067348
PCT Pub. Date: Jun. 29, 2006

(65) Prior Publication Data
US 2008/0135264 A1    Jun. 12, 2008

(30) Foreign Application Priority Data
Dec. 20, 2004  (FR) .................................. 04 53096

(51) Int. Cl.
| A62C 3/06 | (2006.01) |
| A62C 2/00 | (2006.01) |
| A62C 8/00 | (2006.01) |
| A62C 37/10 | (2006.01) |
| A62C 35/00 | (2006.01) |
| E21F 5/10 | (2006.01) |
| E21B 35/00 | (2006.01) |
| B65B 1/30 | (2006.01) |
| F16K 21/18 | (2006.01) |
| E03B 11/00 | (2006.01) |
| F24F 7/00 | (2006.01) |
| F24F 7/06 | (2006.01) |
| B65D 25/10 | (2006.01) |

(52) U.S. Cl. ............................. 169/66; 169/45; 169/48; 169/49; 169/64; 169/61; 169/68; 169/13; 169/69; 141/198; 137/386; 137/571; 454/339; 454/341; 454/342; 454/344; 220/580

(58) Field of Classification Search .................. 169/66, 169/45, 48, 49, 64, 60, 61, 68, 13, 69; 141/198; 137/386, 571; 454/339, 341, 342, 344; 220/580
See application file for complete search history.

(56) References Cited

U.S. PATENT DOCUMENTS 1,142,520 A * 6/1915 Holmes ....................... 169/58

(Continued)

FOREIGN PATENT DOCUMENTS

JP    04090768 A  *  3/1992

*Primary Examiner*—Len Tran
*Assistant Examiner*—Steven M Cernoch (57) ABSTRACT

The device of the present invention is located in a closed containment enclosure surrounding a storage bin and comprises a closed tank (28) positioned on the storage bin containing a liquid (26) and having a fireproof shield enclosing the tank and a liquid level control system for controlling the level of liquid in the tank with the tank (28) comprising at least one opening in communication with the closed container enclosure, and at least one internal chamber in direct communication with the storage bin via a flue pipe and at least one external chamber in direct communication with the containment enclosure via said at least one opening.

19 Claims, 7 Drawing Sheets

U.S. PATENT DOCUMENTS

| | | | | |
|---|---|---|---|---|
| 1,849,932 A * | 3/1932 | Johnson et al. | ............... | 134/10 |
| 2,079,438 A * | 5/1937 | Ellis | ........................... | 169/66 |
| 2,202,176 A * | 5/1940 | Timpson | ..................... | 261/76 |
| 2,596,399 A * | 5/1952 | Hammett | ..................... | 169/49 |
| 2,701,710 A * | 2/1955 | Schilling et al. | ......... | 261/114.1 |
| RE26,020 E * | 5/1966 | Powell | ....................... | 169/66 |
| 3,415,323 A * | 12/1968 | Ajovalasit | .................... | 169/46 |
| 4,148,361 A * | 4/1979 | Christensen | ................ | 169/66 |
| 4,194,572 A * | 3/1980 | Thery et al. | .................... | 169/66 |
| 4,367,861 A * | 1/1983 | Bray et al. | .................... | 251/61 |
| 4,469,129 A * | 9/1984 | Dixon | ........................ | 137/587 |
| 4,615,362 A * | 10/1986 | Hartman et al. | ............... | 141/86 |
| 4,664,199 A * | 5/1987 | Grant et al. | .................... | 169/46 |
| 4,859,405 A * | 8/1989 | Squarer et al. | ............... | 376/299 |
| 4,881,579 A * | 11/1989 | Sharp | .......................... | 141/86 |
| 4,911,326 A * | 3/1990 | McGouran, Jr. | ........ | 220/560.03 |
| 4,960,222 A * | 10/1990 | Fields, III | ............. | 220/560.03 |
| 4,993,497 A * | 2/1991 | Majors | ........................ | 169/66 |
| 5,017,331 A * | 5/1991 | Eckardt | ...................... | 376/313 |
| 5,038,456 A * | 8/1991 | McGarvey | .................... | 29/460 |
| 5,081,761 A * | 1/1992 | Rinehart et al. | ............... | 29/428 |
| 5,088,530 A * | 2/1992 | Harp | .......................... | 141/86 |
| 5,163,517 A * | 11/1992 | Kozai et al. | .................... | 169/60 |
| 5,284,191 A * | 2/1994 | McGarvey | .................... | 141/198 |
| 5,314,027 A * | 5/1994 | Wood | .......................... | 169/60 |
| 5,395,408 A * | 3/1995 | Zeritis | ..................... | 261/121.1 |
| 5,464,065 A * | 11/1995 | Kaylor | ........................ | 169/44 |
| 5,562,162 A * | 10/1996 | Webb | .......................... | 169/45 |
| 5,566,766 A * | 10/1996 | Williams | ...................... | 169/43 |
| 5,829,533 A * | 11/1998 | Williams | ...................... | 169/46 |
| 5,884,709 A * | 3/1999 | Evans et al. | .................... | 169/46 |
| 5,913,366 A * | 6/1999 | Williams et al. | ............. | 169/46 |
| 5,944,091 A * | 8/1999 | Weber | ....................... | 165/100 |
| 5,990,789 A * | 11/1999 | Berman et al. | ............. | 340/506 |
| 6,012,532 A * | 1/2000 | Kiefer et al. | .................. | 169/45 |
| 6,039,123 A * | 3/2000 | Webb | .......................... | 169/45 |
| 6,173,662 B1 * | 1/2001 | Donovan | ................... | 110/237 |
| 6,637,976 B2 * | 10/2003 | Stanton | ....................... | 405/53 |

* cited by examiner

DEVICE FOR LIMITING THE ULTIMATE CONSEQUENCES OF A FAILURE TO BRING UNDER CONTROL A MASS FIRE IN A STORAGE BIN FOR HAZARDOUS MATERIALS

TECHNICAL FIELD

The invention relates to the field of devices for limiting the consequences of a fire, which guarantee that the fire, does not spread. More particularly, it relates to a device adapted, in case of fire, to installations which hold and keep in containment hazardous materials, such as nuclear materials, chemical or virological products.

PRIOR ART

One of the major issues around installations which hold and keep in containment hazardous materials is to guarantee the absence of risk in transferring them to human beings and to the environment, populations, and more particularly the personnel operating said installations.

Hazardous materials are packaged and placed in a leak tight unit known as a storage bin. Specifications on environmental protection require allowance to be made for any potential failure of the leak tightness of the storage bin. It is customary to apply two additional protection principles, in order to isolate the hazardous materials from the natural environment.

A first principle consists in interposing a number of static barriers so as to limit the consequences of one of them failing. The storage bin is implanted inside a containment enclosure, which is itself isolated from the outside. This containment enclosure plays a role as a second protective barrier. The storage bin and the containment enclosure are made leak tight by the provision of leak tight bulkheads and leak tight doors.

A second principle consists in creating a dynamic containment system by using mechanical ventilation, which creates a negative pressure cascade from the outside of the installation towards the storage bin, so as to overcome the tightness defects in the static barriers. The containment enclosure and the storage bin each have an independent ventilation system composed of a network for blasting air coming from the outside and a network for extracting the air towards the outside. In addition to containment by keeping the units at risk at negative pressure, the ventilation systems provide additional functions such as air renewal (of the order of a few volumes/hour) and purification, by purification filters adapted to the types of hazardous materials. These functions help to keep the atmosphere of the storage bin and containment enclosure clean so as to limit the risks of transferring hazardous materials to the environment.

Holding hazardous materials therefore requires the use of a complete installation without being limited to a single protective barrier. If the two protection principles mentioned above are considered as sufficient in normal operation, allowance needs to be made for accidental situations such as an earthquake and/or a fire. This is in particular the case in the area of hazardous materials storage, where stringent principles of analysis and rules on construction are laid down by the safety authority.

In some cases, fire risk analysis leads to the consideration of an envelope scenario of a mass fire that has not been brought under control in a fire sectored unit, in other words a unit with bulkheads qualified in respect of their fire resistance. The development of such a scenario may lead to the terms of operation of purification devices, such as purification filters, being outstripped. For example, in the nuclear field, the most effective very high-performance filters are qualified for 200° C. The ventilation must then be stopped and isolated, by fire dampers, the most effective of which in the nuclear field are qualified for a pressure strength of 2100 Pa. This isolation of the storage bin, when it is on fire, leads to a pressure build-up that may burst the static containment, in the absence of special additional arrangements. This burst could lead to unacceptable consequences for the environment.

Indeed analysing the fire risk via the ingredients needed for a fire to develop, known as the "fire triangle", gives the following results: the hazardous materials and the equipment present in the storage bin constitute the fuel; the air present in the storage bin and the air brought in by the blast network of the storage bin ventilation system represents the oxidizer. In this approach only the ignition energy is missing from the fire triangle, for an initial fire to be triggered in the storage bin. In fact recent changes in the statutory approach to fire in respect of basic nuclear installations lay down that fire ignition should be postulated deterministically. All the elements are therefore in place to allow consideration of the start and development of fire in the storage bin.

Furthermore, the hazardous nature of the materials being held puts constraints, in some cases, on the conditions under which firemen can operate in the storage bin and on the possibilities of using remote extinction systems. The impossibility of being able to guarantee, in this context, that the fire can be quickly brought under control compels us to take into consideration that the fire may spread to the whole storage bin.

Figure 1:
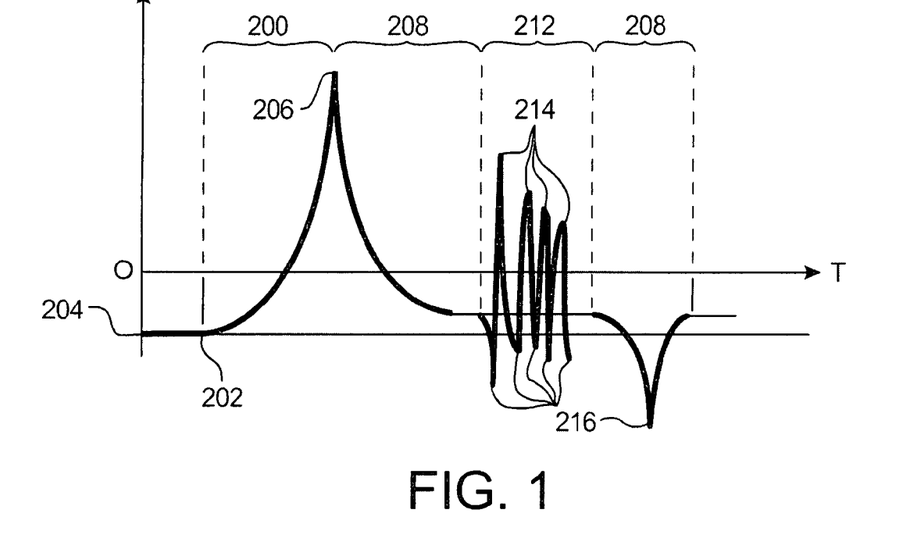

Lastly, the knowledge that has been acquired of fires in confined spaces has made it possible to establish three successive phases in the development of a fire, given on the curve in FIG. 1, which is a theoretical pressure curve of a mass fire that has not been brought under control in a storage bin which holds and keeps in containment hazardous materials, and on which the axis of the x-coordinates corresponds to the time (T) and the axis of the y-coordinates corresponds to the pressure (P).

The first phase, denoted by the identification number 200 in FIG. 1, is a fire development phase. This first phase 200 corresponds to a phase during which the oxidizer is non-limiting. In the absence of an extinction system in the storage bin, the thermodynamic conditions constituted by the pressure and temperature are dependent on how the fire changes. From the moment combustion 202 starts, the pressure P increases from a negative value of initial negative pressure 204 up to a peak overpressure at the height of the power of the fire 206. It is noted that a significant and rapid increase in temperature and pressure in the storage bin, of the order of several hundreds of degrees and several tens of thousands of pascals, is such that it may cast doubt on the integrity of the static containment of the storage bin, its arrangements for isolation from the environment, particularly its fire dampers and filters, its fire sectoring arrangements, and in particular its bulkheads and its leak tight doors.

The extreme conditions above induce a risk of the hazardous materials being disseminated towards the containment enclosure and towards the environment, and of the fire spreading to the rest of installation. The automatic closure of the storage bin blast network, as soon as the fire is detected, limits the development of the fire in the storage bin since only the oxygen present is consumed by the fire. The fire is then limited by the oxidizer present in the storage bin, and no longer by the fuel.

The second phase, denoted by the identification number 208 in FIG. 1, is a fire quenching phase. This second phase 208 corresponds to a period during which the power of the fire is limited by lack of oxidizer. Quenching the fire causes the temperature to drop, and therefore markedly reduces pressure down to negative values 216, of the order of several thousands of pascals. This significant negative pressure in the storage bin may also cast doubt on the integrity of structures already weakened by the extreme conditions of the fire. During the quenching phase 208, once the pressure in the storage bin has become negative, the intake of air through damaged structures may entail a risk of re-ignition of the fire.

The third phase, denoted by the identification number 212 in FIG. 1 is a fire resumption phase. Given the intake of oxidizer described in the second phase 208, a fire resumption phenomenon may occur in the storage bin. New extinction and re-ignition cycles are therefore triggered between peak overpressures at re-ignition 214 and peak negative pressures at extinction 216, which correspond to build-ups of pressure and temperature and therefore to possible releases to the environment. However, the thermodynamic conditions of a new fire cycle are less extreme than during the first phase 200, since the quantity of oxygen present in the storage bin, arising out of damage caused by the preceding phases, is less significant than during the first phase 200.

Even if this is a hypothetical scenario, given that no spark source is present in the storage cell, the consequences of a fire of this kind would not be acceptable: potential discharge of hazardous materials into the environment, potential spread of the fire to the rest of the installation, potential contamination of the environment, of populations, and in a more particular way of the personnel operating said installations.

It is therefore necessary to put in place a device which limits the risk of direct transfer from the storage bin to the environment external to the installation through damage done to the isolation devices of the storage bin, and which prevents any spread of the fire from the storage bin to the rest of the installation or even the environment.

A device appropriate to these functions must furthermore comply with a certain number of constraints.

First of all, the device must be passive. Indeed design principles in terms of safety require that its operation is not dependent on equipment (pumps, compressors, ventilators, actuators, control and command systems etc) energy source or sensors that are themselves liable to fail.

Moreover, its operational availability must be guaranteed, since it operates as the ultimate and "intrinsic" passive safeguard solution, when the usual construction and operating arrangements (prevention, surveillance, detection, intervention) have been exhausted.

Next, the device must be capable of delivering its functions during the phases 200, 208 and 212 of the fire.

Lastly, the device must not bring risks of failure in the static and dynamic containment of the storage bin in normal operation of the installation.

A first objective which must be met by the device is to prevent the transfer of hazardous materials towards the environment external to the installation. To this end, it is necessary to fulfil simultaneously the following conditions:

to guarantee the integrity of the static containment of the containment enclosure, in other words its pressure strength, to guarantee the effectiveness of the containment enclosure ventilation system, in other words keeping it at negative pressure and the integrity of the purification filters, to guarantee, in case of fire in the storage bin, the integrity of the static containment of the storage bin, in particular the containment components, to limit the transfer of aerosols outwards from the storage bin, and to guarantee the effectiveness of the containment enclosure ventilation system, in other words keeping it at negative pressure, and the integrity of the purification filters.

A second objective which must be met by the device is to prevent the fire from spreading from the storage bin to the containment enclosure and/or to the rest of the installation. To this end, it is necessary to meet simultaneously the following conditions:

to curb the pressure conditions generated in the storage bin at a few thousands of pascals by allowing a discharge and an intake of gas, to ensure the integrity of storage bin fire sectoring arrangements such as the fire dampers and/or the fire doors, to channel and control the discharge produced during the first phase of the fire, and to lower the temperature of the discharge to a temperature below the threshold combustion residue re-ignition temperature.

These objectives must be met, in particular for high temperatures, low-pressure values (about 2000 Pa), and significant gas flow rates.

A certain number of existing devices offer a partial response to the functions and constraints disclosed previously. All these devices enclose water or a liquid, which makes it possible, in a normal or accidental operating situation:

to cool the gases, to wash the gases.

These devices are similar to bubblers, and by extension may be likened to gas washer devices. They are based on the principle of the bubbling of gases in water in order to wash them and for the most sophisticated ones to lower their temperature by thermal exchange. The size of the bubbles formed in these devices remains the decisive factor in their efficiency since the exchange surface between the gases and the liquid is conditioned by this. These devices may be classified in three large families.

The first family of gas washer devices encompasses basic devices consisting in making combustion gases bubble in a tank of water as in the active device disclosed in U.S. Pat. No. 5,395,408. In this case the bubbling cools the gases and extinguishes the incandescent ash. This device has certain similarities to spark suppressors. Furthermore, these devices prove to be ineffective for the thermodynamic conditions of the envelope scenario of the present patent application. Indeed, since the size of the gas bubbles in water is not under control, the device must be of disproportionate size to give an exchange surface sufficient for cooling the gases and to contain a very significant volume of water in order to offset evaporation.

The second family of gas washer devices is an improved version of the first family. As with the passive device disclosed in U.S. Pat. No. 4,859,405, it consists in bubbling gases through a porous filter bed immersed in a tank of water. The objectives of the porous filter are to trap the particles conveyed by the gases, but also to restrict the size of the bubbles formed in the porous bed in order to improve the thermal exchange between the gases and the water. As with the devices of the first family, this device has the drawback of requiring, from 500° C., large quantities of water or liquid, to compensate for evaporation and to provide an effective thermal exchange. Furthermore, passing the gases through the porous filter bed, conventionally made up of sand or gravel, brings about very significant losses of pressure. This device does not prove satisfactory, since the triggering pressure, at around 100,000 Pa, is about 2 orders of magnitude higher than that for the applications specified in the present patent application.

The third family of gas washer devices is also an improved version of the first family of gas washer devices. It consists, as disclosed in the patent GB 526 178, in washing the gases by passing and bubbling these gases through two intercommunicating chambers before they are discharged outwards. The first chamber contains a washing liquid such as water, and the second chamber, which has a passage surface equal to twice that of the first, is made up of grids pierced by openings of small diameter, typically 1 mm, immersed in the liquid. Apart from these significant pressure losses and these limited thermal exchange capacities, the drawback of this device lies in its very considerable size, since in the thermodynamic conditions of a fire, a temperature of about 1,000° C. and a throughput for treatment of about once the volume of the unit in one hour, equipment would need be employed that is too bulky for the constraints of the applications specified in the present patent application.

None of the gas washer devices disclosed in these patents meets the functions and constraints set out previously, for an installation holding hazardous materials, in the event of the envelope scenario envisaged for the present invention.

In particular, none of these devices is really passive in the sense that the system is only triggered, following the detection of an increase in temperature or pressure, by opening valves or starting the suction of gases towards the device.

Furthermore, all prior art gas washer devices can only be used, in the event of the envelope scenario envisaged, for the discharge of gas. None of these devices has been designed to be reversible, in other words, usable for all the pressure build-up phases 200, the negative pressure phases 208, and the pressure cycles 212, by successively:
- discharging gases from the storage bin on fire towards the containment enclosure during the first phase 200 of fire development and during the pressure cycles 212,
- letting in fresh air from the containment enclosure to the storage bin during the second phase 208 of quenching the fire and during the pressure cycles 212,
- controlling, mechanically and passively, the levels of liquid in the device.

DISCLOSURE OF THE INVENTION

The purpose of the present invention is to provide a limitation device which, in the event of a mass fire that is not brought under control in a storage bin for hazardous materials, prevents the risk of their being transferred to the environment external to the installation, which guarantees that the fire does not spread from the storage bin to the containment enclosure, but which does not present the drawbacks of prior art devices, which is triggered for low pressures while being capable of discharging significant outflows, which is passive, reversible and compact, and which guarantees the containment of the storage bin in normal operation.

This purpose is fulfilled with a limitation device of the "hydraulic fire valve" type, implanted in the enclosure and directly connected to the bin.

According to the invention, the device for limiting the ultimate consequences of a mass fire that is not brought under control in a storage bin, said storage bin being implanted in a containment enclosure, comprises a closed tank containing a non-flammable liquid, said tank comprising an internal chamber in direct communication with said storage bin via a flue pipe, at least one external chamber in direct communication with said containment enclosure via at least one upper opening of said tank, a fireproof shield, and a liquid level control system.

To be more precise, the tank comprises:
- an upper wall, a lower wall and lateral walls,
- separation elements, anchored by an upper end to said at least one opening of said upper wall, without reaching said lower wall of the tank, said separation elements defining an internal chamber in direct communication with said storage bin via said flue pipe, and at least one external chamber in direct communication with said containment enclosure via said at least one opening.

Preferably, the separation elements are four in number for each opening and each opening has a rectangular outline.

The separation elements are fitted with wave breaker devices formed by metal plates anchored to lower ends of the separation elements orientated towards the inside of said at least one external chamber.

The limitation device additionally comprises a bubble fractionation device associated with each external chamber.

Each bubble fractionation device is constituted by superimposed layers of intermeshed wires, which are separated from each other by holding grids.

The bubble fractionation devices are anchored to the wave breaker devices using spacers.

The limitation device is placed in the containment enclosure, outside the storage bin, and anchored to a support bulkhead which is a leak tight bulkhead forming a constituent part of the storage bin.

The flue pipe provides communication between the storage bin and the internal chamber by passing through the support bulkhead.

The limitation device comprises a fireproof shield. The fireproof shield is formed of plaster panels, placed around the limitation device and anchored to the support bulkhead.

The liquid level control system comprises:
- a first control compartment, which communicates with the tank underneath the free surface of the liquid and which communicates with the storage bin above the free surface of the liquid so as to be at the same pressure as the storage bin,
- a second control compartment, which communicates with the tank underneath the free surface of the liquid and which communicates with the containment enclosure above the free surface of the liquid so as to be at the same pressure as the containment enclosure,
- a first float valve, placed in the first control compartment and closed in normal operation, and
- a second float valve, placed in the second control compartment and open in normal operation,
- and in that the tank is supplied with liquid when the two float valves are open simultaneously.

The first control compartment comprises an aeration orifice directly connected to the flue pipe, by means of which the first control compartment is at the same pressure as the storage bin.

The second control compartment comprises a vent directly connected to the containment enclosure, by means of which the second control compartment is at the same pressure as the containment enclosure.

The liquid level control system additionally comprises an emergency valve intended for manual control of said system.

Each control compartment comprises an overflow fitted with a siphon, allowing the liquid to be discharged towards a recovery tank.

The limitation device additionally comprises a reserve of liquid, a filler pipe supplying the tank from the reserve, and an outlet pipe.

Preferably, all its constituent elements are made of stainless steel to prevent corrosion.

Preferably, the liquid contained in the tank is water.

BRIEF DESCRIPTION OF THE DRAWINGS

Figure 2:
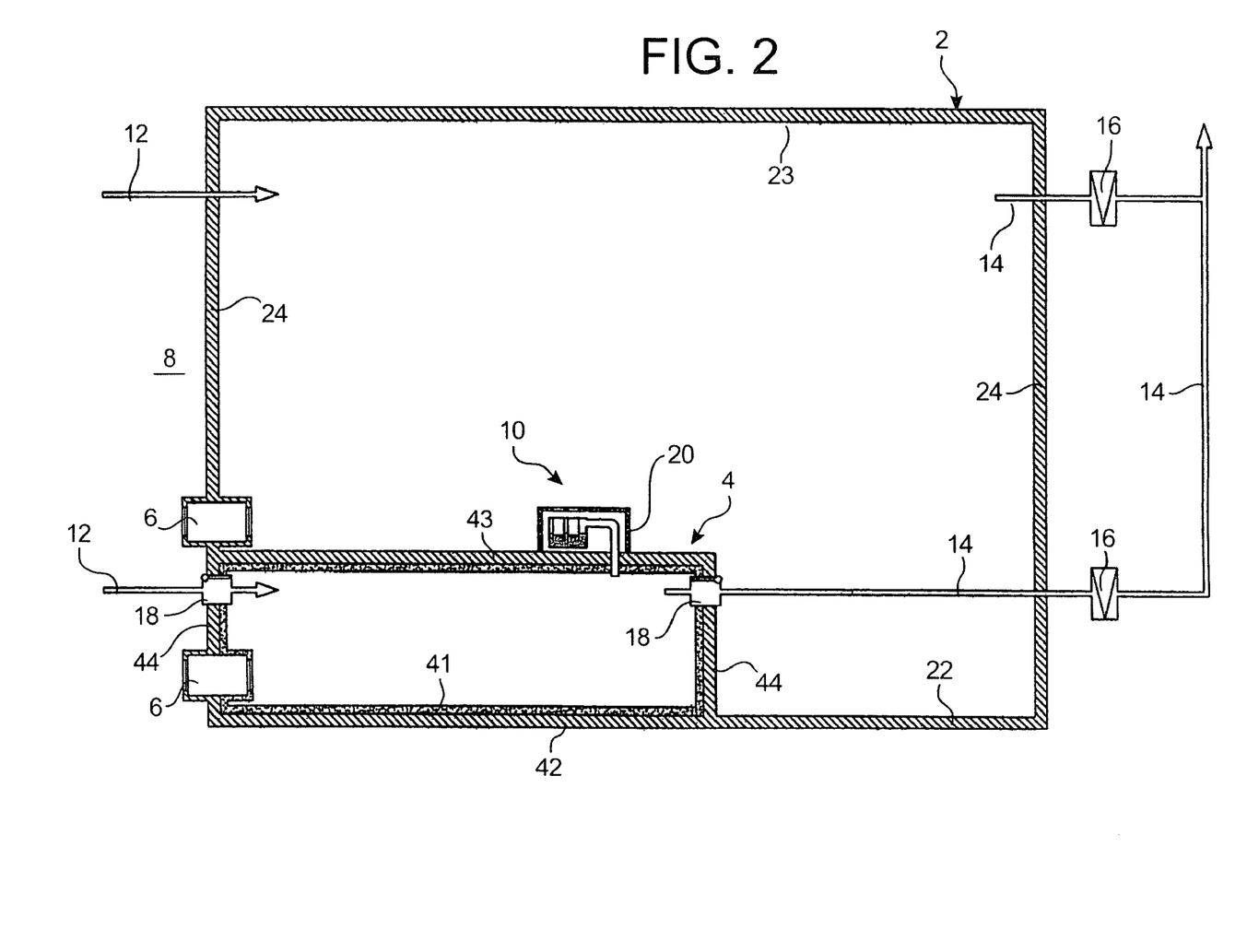
Figure 3:
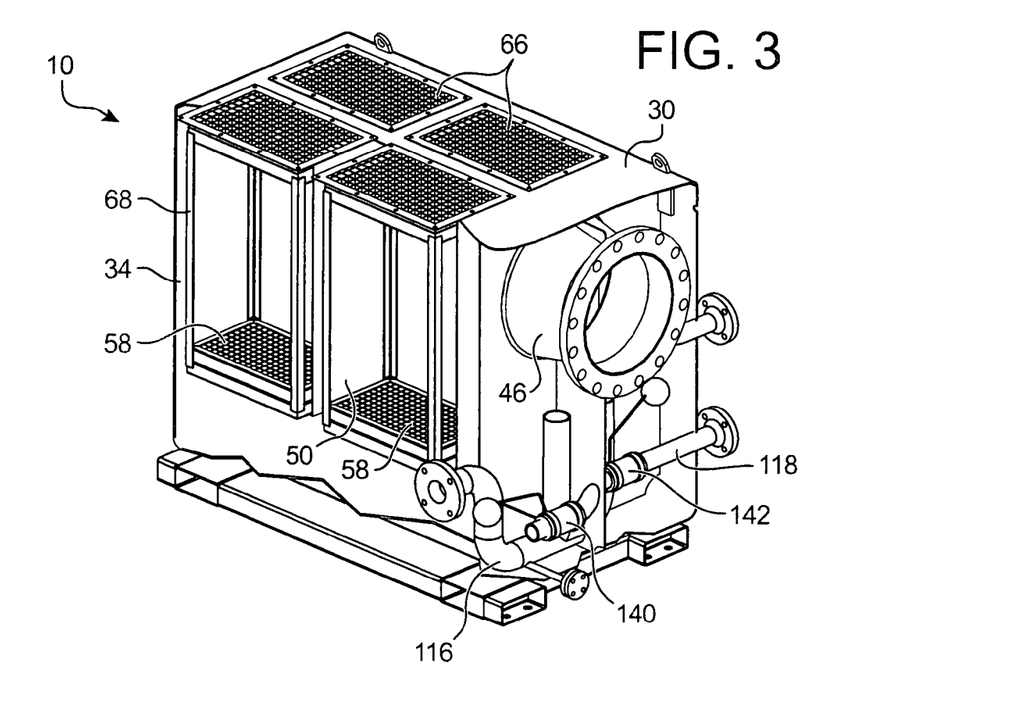
Figure 4:
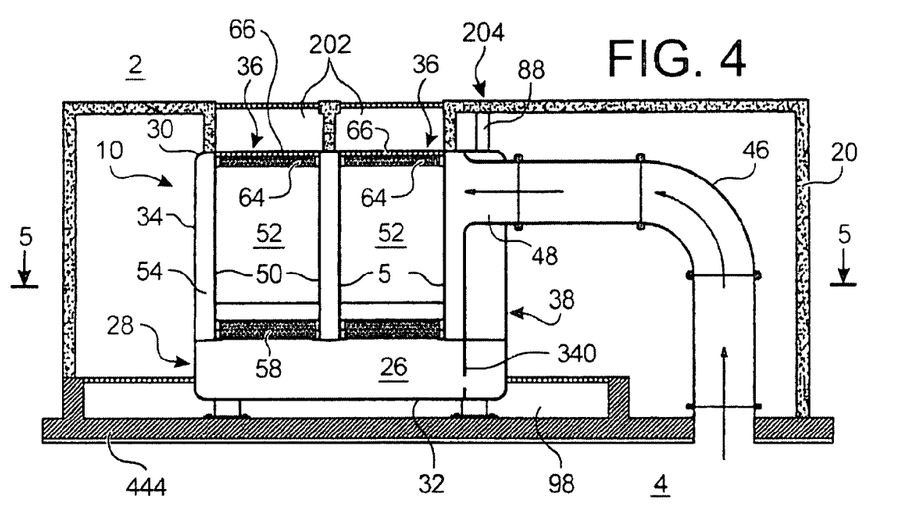
Figure 5:
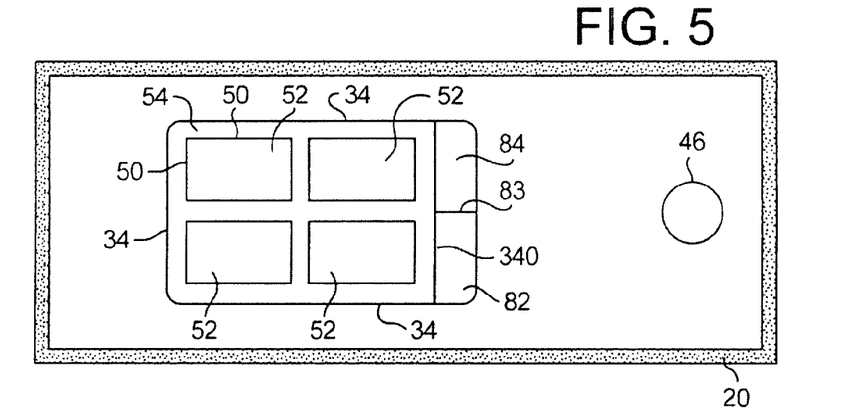
Figure 6:
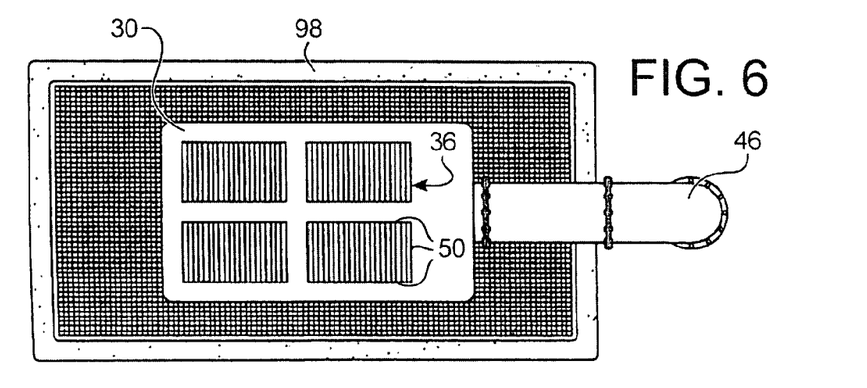
Figure 7:
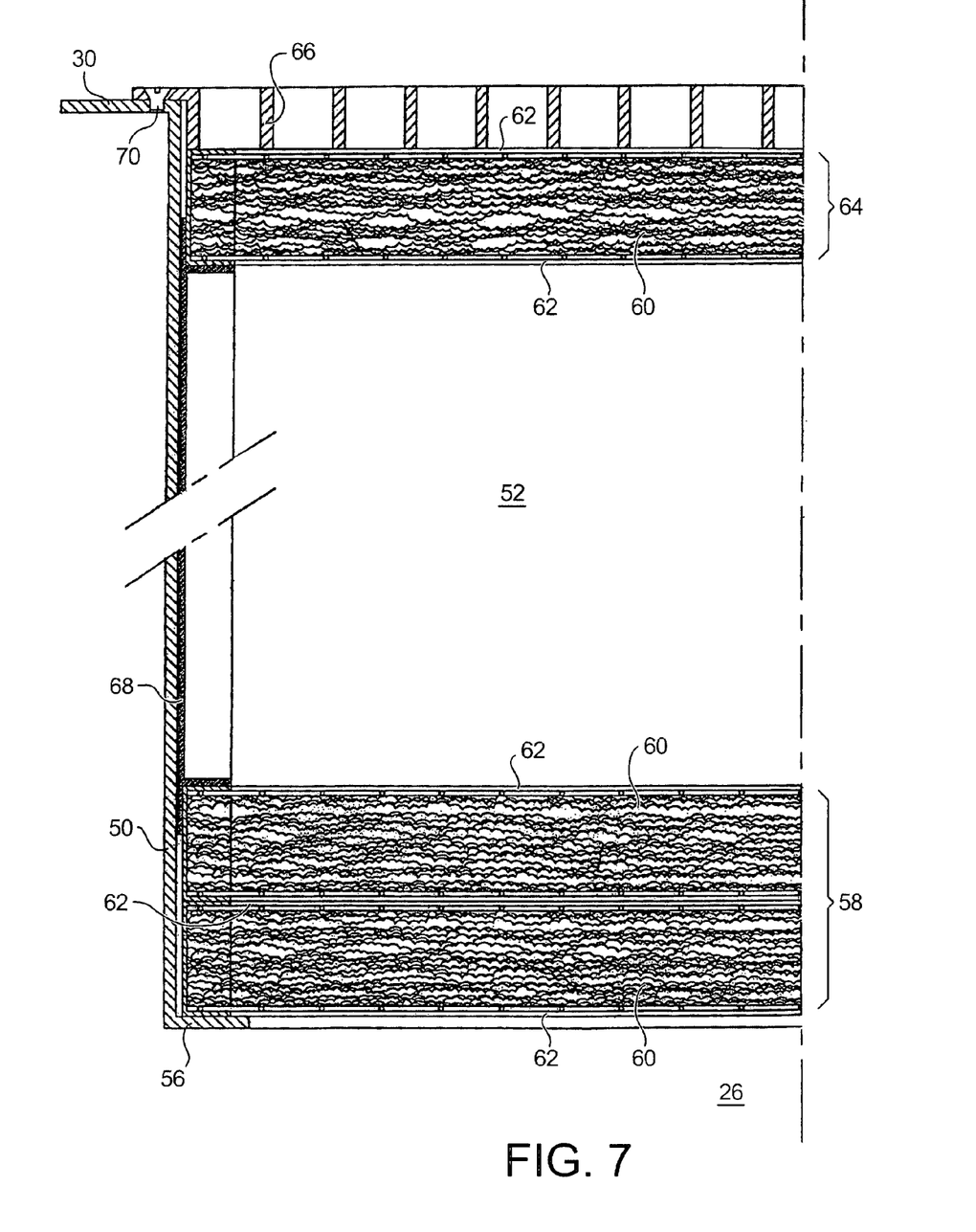
Figure 8:
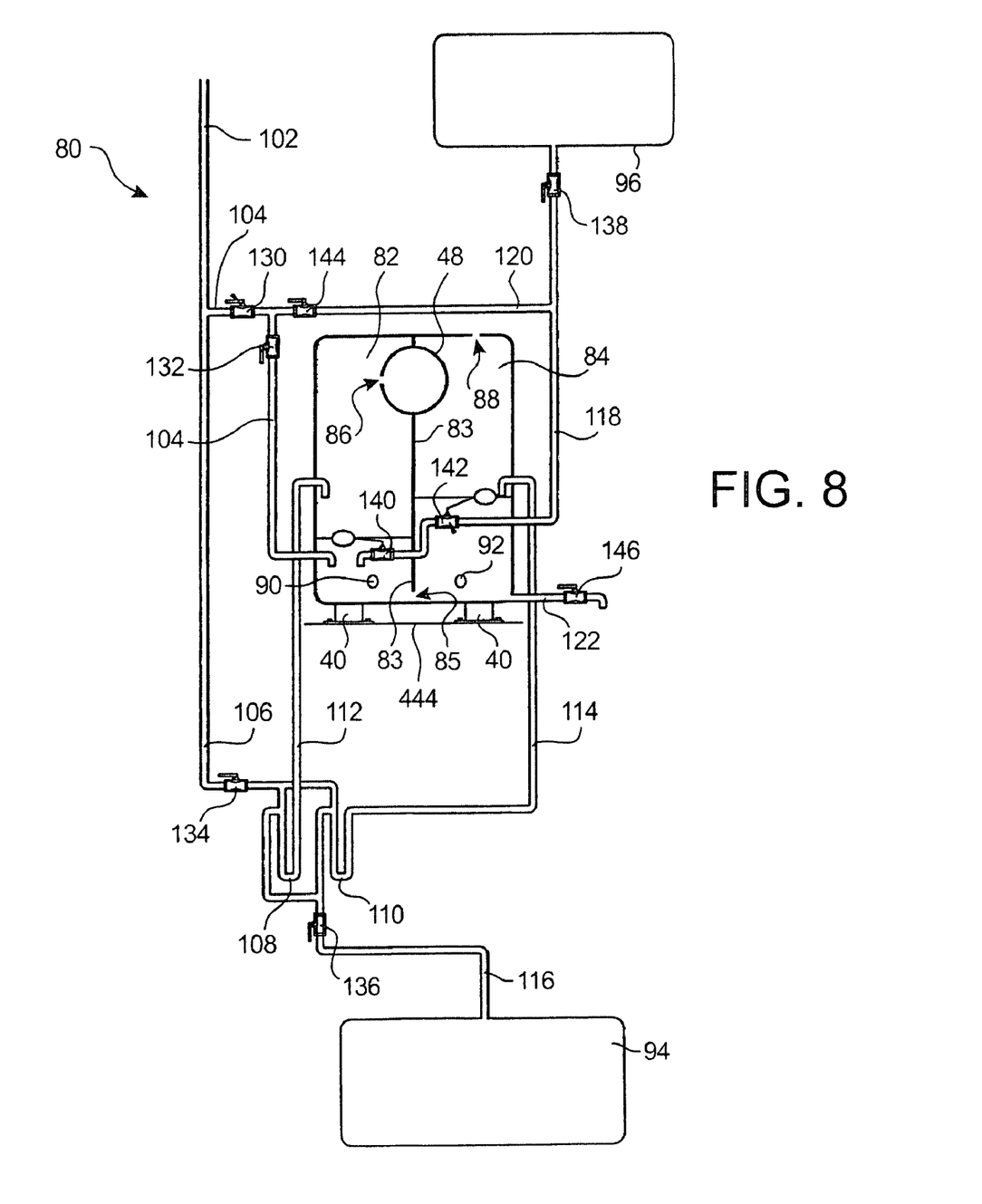
Figure 9:
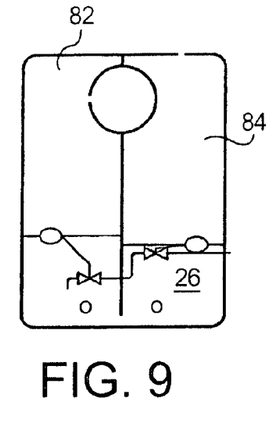
Figure 10:
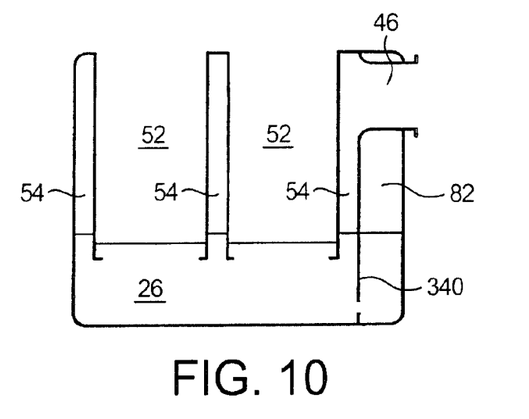
Figure 11:
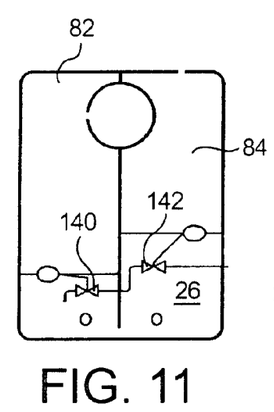
Figure 12:
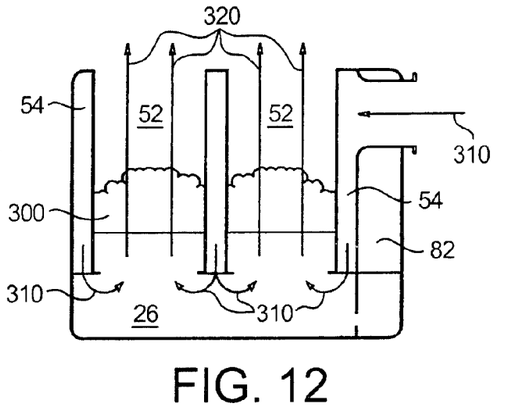
Figure 13:
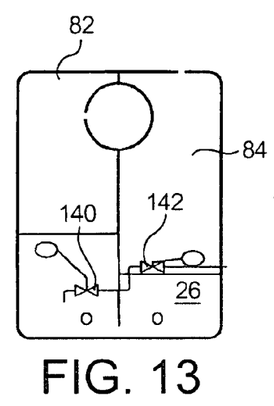
Figure 14:
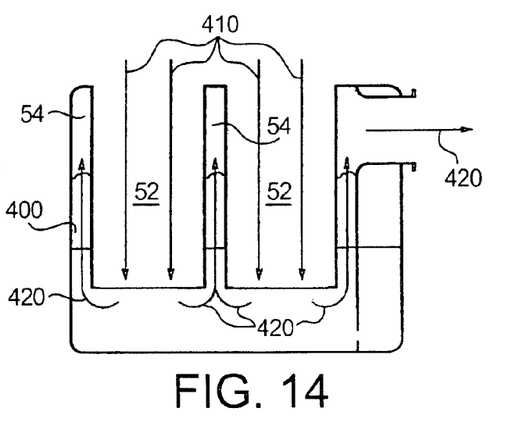
Figure 15:
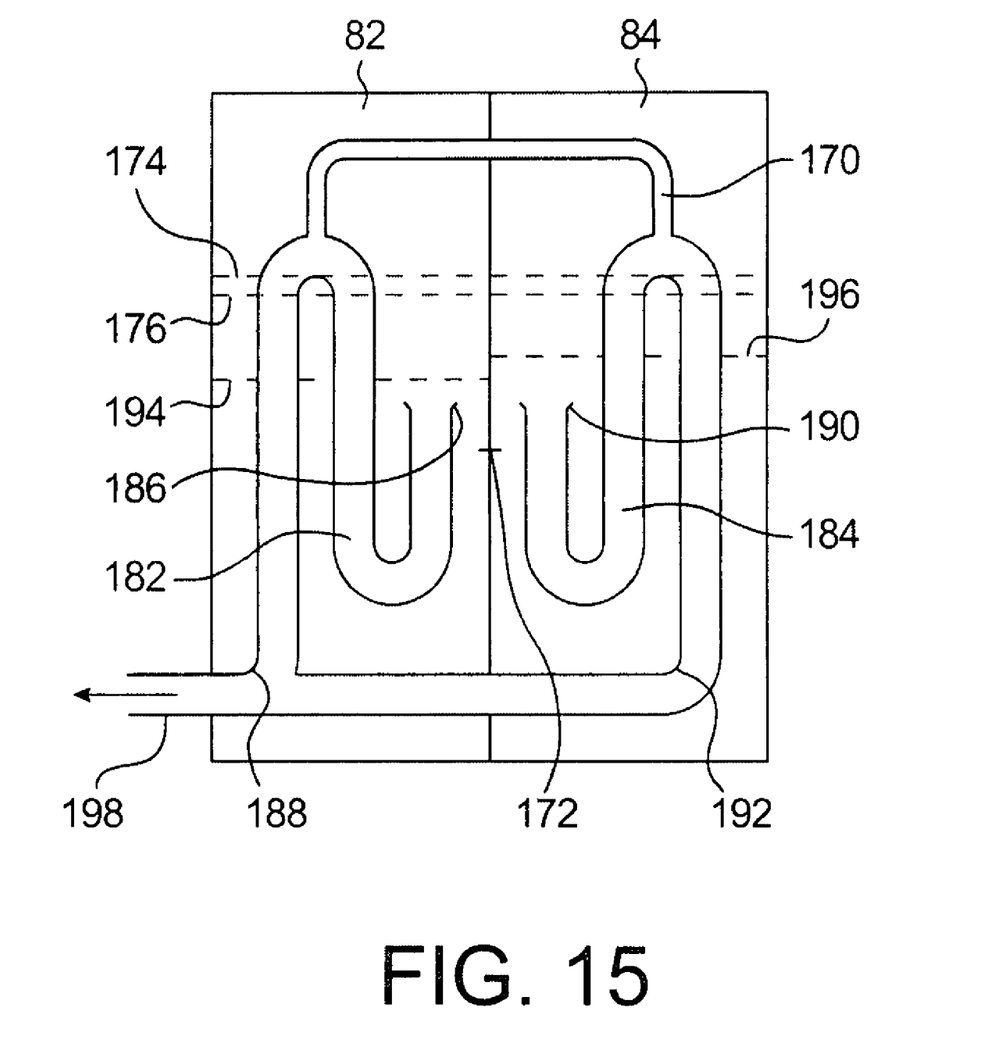

The invention will be better understood from reading the following detailed description of embodiments of the invention, provided by way of illustration and in no way restrictively, with reference to the appended drawings, in which:

FIG. 1, already described, shows the theoretical pressure curve for a mass fire that is not brought under control in a storage bin containing hazardous materials;

FIG. 2 is a longitudinal cross-section in elevation which shows the implantation, in a containment enclosure, of a limitation device connected to a storage bin;

FIG. 3 is a view of the limitation device, in perspective and in cross-section;

FIG. 4 is a view of the limitation device, in longitudinal cross-section in elevation;

FIG. 5 is a view of the limitation device in cross-section along the line 5-5 in FIG. 4;

FIG. 6 is a view from above of the limitation device, with the fireproof shield omitted;

FIG. 7 shows a partial view in cross-section in elevation, of an external chamber of the limitation device;

FIG. 8 shows the limitation device in transverse cross-section in elevation, and shows the liquid level control system in the limitation device;

FIGS. 9 and 10 show the liquid level control system and the limitation device respectively during the balanced phase of its operating cycle;

FIGS. 11 and 12 shows the liquid level control system and the limitation device respectively during the discharge phase of its operating cycle;

FIGS. 13 and 14 shows the liquid level control system and the limitation device respectively during the intake phase of its operating cycle; and FIG. 15 is a view in transverse cross-section of the limitation device, showing a variant in which the siphons are built into the casing.

DETAILED DISCLOSURE OF PARTICULAR EMBODIMENTS

With reference firstly to FIG. 2, an implantation is shown in diagrammatic form of a limitation device 10 in accordance with the invention in a storage facility for hazardous materials, such as nuclear waste for example. FIG. 2 shows, in longitudinal cross-section in elevation, the storage facility, which comprises a containment enclosure 2 in which is included a storage bin 4. The hazardous materials are stored in the storage bin 4.

The volume of the containment enclosure 2 is approximately equal to five times the volume of the storage bin 4. This ratio of volumes, combined with the ventilation rate of the containment enclosure 2, allows any gases that might be transferred from the storage bin 4 towards the containment enclosure 2 to be diluted.

The containment enclosure 2 comprises a lower bulkhead 22, an upper bulkhead 23, and lateral bulkheads 24. The storage bin 4 is placed inside the containment enclosure 2, on the lower bulkhead 22 of the containment enclosure 2. The storage bin 4 comprises a lower bulkhead 42 which is merged with the lower bulkhead 22 of the containment enclosure 2. It also comprises an upper bulkhead 43 and lateral bulkheads 44. In the embodiment shown in the figures, the containment enclosure 2 and the storage bin 4 have two common lateral bulkheads. The height of the storage bin 4 is less than the height of the containment enclosure 2. The bulkheads 42, 43, 44 of the storage bin 4 are made of concrete. They are covered, inside the storage bin 4, with a fire sectoring coating made of plaster and/or concrete.

The lower bulkhead 22 of the containment enclosure 2 is made of concrete. The upper 23 and lateral 24 bulkheads of the containment enclosure 2 are made of metal. A 5 mm thick metal skin made of steel is welded continuously onto a metal frame.

All the bulkheads 22, 23, 24, 42, 43, 44 are liquid and gas tight.

Lock chambers 6 give the operating personnel access to the containment enclosure 2 and to the storage bin 4 from outside 8 with no break in the containment.

The containment enclosure 2 and the storage bin 4 are both fitted with a ventilation system. These ventilation systems each comprise a network 12 for blasting air from the outside 8, a network 14 for extracting air towards the outside 8, and an air purification filter 16. Preferably, the ventilation systems have a rate of renewal of two Volumes/hr, to ensure air renewal and purification, and dynamic containment in the containment enclosure 2 and the storage bin 4. The ventilation system of the storage bin 4 also comprises fire dampers 18 installed in the blasting and extracting pipes of the ventilation system so as to ensure continuity of fire sectoring.

The limitation device 10 is installed inside the containment enclosure 2 and outside the storage bin 4. It is anchored to a support bulkhead, which is the upper bulkhead 43 of the storage bin 4.

Clearly, several limitation devices according to the invention can be associated in parallel to increase treatment capacity.

The limitation device 10 will now be described, with reference to FIGS. 3 to 7. The different constituent elements of the limitation device 10, which will be described hereinafter, are preferably made of stainless steel to prevent them becoming corroded.

The limitation device 10 comprises a tank 28, which contains a non-flammable liquid 26, for example water from the mains water supply. The tank 28 is constituted by an upper wall 30, by a lower wall 32 and by lateral walls 34, in such a way that it is closed. It comprises openings 36 located on its upper wall, which are in direct communication with the containment enclosure 2 in order to limit losses of pressure downstream of the limitation device 10. In the embodiment shown, the openings 36 are rectangular, they all have the same dimensions and they are placed so as to be substantially symmetrical and equidistant relative to the median axes of the length and breadth of the upper wall.

The limitation device 10 comprises a flue pipe 46 which allows exchanges of gas between the storage bin 4 and the tank 28 of the limitation device 10. One of the ends of the flue pipe 46 is connected to an infall 48 which emerges in the tank 28 by passing through one of the lateral walls 34. In the example shown, this end of the flue pipe 46 is connected to the tank 28 by a tulip shaped flaring, thereby restricting losses of pressure. The other end of the flue pipe 46 passes through the support bulkhead and emerges in the storage bin 4. The flue pipe 46 is designed by calculating the outflows from the storage bin 4 so that the pressure in the storage bin 4 does not exceed a "safety pressure" $P_S$ corresponding to the pressure strength of the most fragile containment components, for example fire dampers 18. The maximum throughput of gas for treatment is determined by evaluating the thermodynamic expansion of the gases according to the development kinetics of the fire, the usual methods for estimating the power of the fire, and the balance of the combustion induced chemical reaction, in other words the gases generated and the oxygen consumed by the combustion.

The tank 28 comprises separation elements 50 presenting themselves substantially in the form of rectangular plates. The separation elements 50 are anchored to the upper wall 30 of the tank 28 and are immersed, in normal operation, in the liquid 26, without reaching the lower wall 32 of the tank 28. With each opening 36 of the upper wall 30 is associated a set of four separation elements 50 which are in twos in parallel and are welded to each other along each edge of said rectangular-shaped opening 36. Consequently, the length of the separation elements is slightly less than the height of the tank 28, the width of two of the separation elements 50 is equal to the length of the openings 36, and the width of the other two separation elements 50 is equal to the width of the openings 36.

The separation elements 50 define in the tank 28 four external chambers 52, which are directly in communication with the containment enclosure 2 via the openings 36 in the tank 28.

The separation elements 50 and the lateral walls 34 define in the tank 28 an internal chamber 54, which is directly in communication with the storage bin 4 via the infall 48 of the flue pipe 46.

The surface of each external chamber 52 is denoted by "S1". It also corresponds to the surface of each opening 36. The sum of the surfaces of the external chambers 52 is denoted by "S". It also corresponds to the sum of the surfaces of all the openings 36. There is a relationship between the sum "S" of the surfaces of the openings 36, the surface "S1" of each opening 36 and the number N of openings 36 in the tank 28. This relationship is: S1=S/N.

The sum "S" of the surfaces of the external chambers 52 and of the surfaces of the openings 36 is determined using an evaluation of the maximum outflow to be allowed to be discharged from the storage bin 4 and of the average speed of rise of the bubbles in the liquid 26. The mean value generally acknowledged by men skilled in the art for this speed of rise is approximately 30 cm per second at ambient temperature.

The surface of the internal chamber 54 is denoted by "s". The ratio of the surface "s" of the internal chamber 54 to the sum "S" of the surfaces of the external chambers 52 is a determining factor in regulating the limitation device 10. Indeed, in association with the height parameter for the liquid 26 in the tank 28, and with the design of the limitation device 10, this factor sets the triggering pressures for the limitation device 10. It must satisfy the following relationship:

$$\frac{s}{S} = \frac{p\_adm}{p\_ech}$$

where p_adm is the triggering pressure for the intake of gas into the storage bin 4 from the containment enclosure 2, and p_ech is the triggering pressure for the discharge of gas from the storage bin 4 to the containment enclosure 2.

As shown in FIG. 7, which shows a partial view, in longitudinal cross-section, of an external chamber 52 of the tank 28, each separation element 50 of the tank is fitted with a small plate 56, called a "wave breaker plate", which is welded at its end which is immersed in the liquid 26 in normal operation of the limitation device 10. Each wave breaker plate 56 extends along a direction substantially perpendicular to that of said separation element 50, towards the inside of the external chamber 52 delimited thereby. These wave breaker plates 56 are sufficiently small in width not to reduce too much the surface "S1" of the external chambers 52. They are sufficiently large in width to limit wave effects in the external chambers 52, in other words the risk of putting the external chambers 52 and the internal chamber 54 into direct communication without creating a phenomenon of bubbling in the liquid 26. Their presence ensures the presence of liquid 26 along the separation elements 50. This promotes the generation of a two-phase environment and avoids the separation of the phases under the dynamic effect, when gases are discharged during the fire development phase 200.

The developed length of bubbling corresponds to the sum of the parameters of the external chambers 52. It is determined by the following relationship:

$$Lb = \frac{Dt}{Ev \times Vv}$$

where
Lb represents the length of bubbling,
Dt represents the throughput of gas to be treated,
Ev represents the thickness of the vein of gas passing from the internal chamber to the external chamber,
Vv represents the velocity of the gases in the vein.

It is thus possible to fix the number of external chambers 52 so as to provide a length of bubbling sufficient to restrict losses of pressure and consequently the operating pressures for the maximum gas throughput.

As shown in FIG. 4, the limitation device 10 comprises bubble fractionation devices 58, which are intended to fractionate the large bubbles of gas formed along the wave breaker plates 56, into small bubbles, so as to increase as far as possible the surface for exchange between gas and liquid 26, during the development phase of a fire 200. Small bubbles are defined as being bubbles that have a diameter of between 1 and 5 mm, and it is generally acknowledged by men skilled in the art that the size of the bubbles is inversely related to the efficiency of the thermal exchange. Bubble fractionation devices 58 therefore promote the thermal exchange between the gases and the liquid 26. They also afford the best possible compromise between pressure loss restriction and the non-coalescence of the bubbles, and the non propagation of sparks, incandescent particles, aerocontaminants and soot.

Each bubble fractionation device 58 is constituted by a stack of layers 60 of intermeshed metal wires, each layer 60 being interposed between two holding grids 62. In the embodiment shown, the layers 60 are two in number. Preferably, each bubble fractionation device 58 is placed in the lower part of an external chamber 52 and blocks it. It rests on the wave breaker plates 56 of said external chamber 52. In normal operation, the bubble fractionation devices 58 are immersed in the liquid 26 of the external chambers 52 of the limitation device 10.

As shown in FIG. 4, the limitation device 10 also comprises anti-splash devices 64, which are intended to restrict splashes of liquid 26 through the openings 36 when gases are discharged from the storage bin 4.

Each anti-splash device 64 is constituted by a layer 60 of intermeshed metal wires, said layer 60 being interposed between the two holding grid 62, and of a grating 66 resting on the upper holding grids 62. Each anti-splash device 64 is placed in the upper part of an external chamber 52 and blocks the opening 36 associated with it. The grating 66 is anchored to the external surface of the upper wall 32 of the tank 28, using appropriate fastening means 70, such as screws for example.

Moreover, spacers 68 are placed against the internal surface of the separation elements 50 of each external chamber 52. These spacers 68 are interposed between the upper holding grid 62 of the bubble fractionation device 58 and the lower holding grid 62 of the anti-splash device 64. They ensure that the bubble fractionation devices 58 remain in position and act as a support for the anti-splash devices 64.

The limitation device 10 additionally comprises a liquid level control system 80 which makes it possible:

to maintain, in normal operation, the level of the liquid 26 in the tank 28, by ensuring that it is perfectly leak proof, and to fill the tank 28 with liquid 26, when gases are discharged during the fire development phase 200, so as to compensate for the consumption of liquid 26, by evaporation, thereby guaranteeing the continuity of the thermal exchange between the gases and the liquid 26 in order to cool the combustion gases to a temperature below the threshold re-ignition temperature.

The liquid level control system 80 is a mechanical system, which is shown in a diagrammatic form in FIG. 8.

The liquid level control system 80 comprises a first control compartment 82 and a second control compartment 84, these two control compartments 82, 84 being closed.

In the example shown in the figures, the two control compartments 82, 84 are placed next to the tank 28 and are located in areas not subject to gas bubbling during the different operating phases of the limitation device 10, in other words the discharge and intake phases.

They are separated by a wall common to the compartments 83 and are in communication with each other via a communication orifice of the compartments 85 which passes through said common wall 83 in its lower part so as to remain immersed during all operating phases of the limitation device 10.

In the example shown in the figures, the two control compartments 82, 84 and the tank 28 are included in one and the same casing 38. The two control compartments 82, 84 are separated from the tank 28 by a common wall 340 which is the lateral wall 34 of the tank 28 on which the flue pipe 46 emerges. Consequently, the flue pipe 46 passes through the two control compartments 82, 84 symmetrically, in the wall common to the tanks 83. The casing 38 is anchored on the floor of the containment enclosure 2 to the support bulkhead 42 using fastening means 40 such as fastening lock plates.

In the example shown in the figures, the casing 38 of the limitation device 10, is substantially rectangular and parallelepiped in shape.

The first control compartment 82 is at the pressure of the storage bin 4 via an aeration orifice 86 directly connected to the flue pipe 46, and it is connected to the tank 28 via a first communication orifice 90 located in the lower part of the common wall 340.

The second control compartment 84 is at the pressure of the containment enclosure 2 via a vent 88 directly linked to the containment enclosure 2, and it is connected to the tank 28 via a second communication orifice 92 located in the lower part of the common wall 340. The vent 88 is for example a tube made of stainless steel.

The liquid level control system 80 also comprises a recovery tank 94 towards which the liquid 26 is discharged, in the event of a malfunction that causes excess liquid in the limitation device 10.

The liquid level control system 80 also comprises a reserve 96 of liquid 26, located higher up relative to the limitation device 10. The reserve 96 makes it possible to feed the casing 38 with liquid 26, in the event of a drop in the level of liquid 26 in the limitation device 10. Its capacity is determined as a function of the power of the fire.

The liquid level control system 80 also comprises a feed and discharge circuit, which comprises:

a pipe 102 for supplying the casing 38 with liquid 26;

a first branch pipe 104 of the feed pipe 102 which feeds the casing 38 directly via the first control compartment 82, and on which are placed in series a first feed valve 130 and a second feed valve 132;

a second branch pipe 106 of the feed pipe 102, on which is placed a siphon valve 134;

a first siphon 108 and a second siphon 110, which are fed by the second branch pipe 106, after the siphon valve 134;

a first overflow 112 and a second overflow 114, which emerge respectively, at a given level, in the first control compartment 82 and in the second control compartment 84, and which are connected, respectively, to each of the two siphons 108, 110;

a pipe 116 for discharging excess liquid 26 in the casing 38, into which the two siphons 108, 110 discharge, and which emerges in the recovery tank 94, and on which is placed an isolation valve 136 downstream of the point where the two siphons 108, 110 meet;

a pipe 118 for filling the casing 38 with liquid 26, on which is placed a filling valve 138; the filler pipe 118 feeds the first control compartment 82, via a first float valve 140 and a second float valve 142 installed in the first control compartment 82 and in the second control compartment 84 respectively, the two float valves 140, 142 being placed in series on said filler pipe 118;

a connection pipe 120 on which is placed an emergency valve 144, which is connected to the first branch pipe 104 of the feed pipe 102 between the two feed valves 130, 132, and which is connected to the filler pipe 118 between the filling valve 138 and two float valves 140, 142, so as to supply the casing 38 via the first control compartment 82 by short-circuiting the float valves 140, 142;

an outlet pipe 122, on which is placed an isolation valve 146, which allows the liquid 26 to be discharged for maintenance of the limitation device 10.

The roles of the different elements of the liquid level control system 80 will be set out in detail below.

The first float valve 140, which is closed in normal operation, is located in the first control compartment 82 connected to the internal chamber 54; the positioning of this first float valve 140 in the first control compartment 82 defines the quantity of liquid 26 which is found in the limitation device 10.

The second float valve 142, which is open in normal operation, is located in the second control compartment 84 connected to the external chambers 52. The positioning of the second float valve 142 in the second control compartment 84 is defined by the triggering pressure of the limitation device 10.

The limitation device 10 is supplied with liquid 26 when the two float valves 140 and 142 are open simultaneously, in other words when the levels of liquid 26 in each of the two control compartments 82 and 84 drop simultaneously.

The liquid reserve 96 has a capacity which is determined as a function of the power of the fire. It is assisted by manually opening the two feed valves 130, 132 on the first branch pipe 104 of the feed pipe 102. This allows the casing 38 to be supplied with liquid 26 by gravity via the first control compartment 82, in one or other of the two following situations:

the filling valve 138 being open, the emergency valve 144 is closed, and the liquid 26 coming from the reserve 96 feeds the casing 38 by flowing into the first control compartment 82 through the two float valves 140, 142, or the filling valve 138 being open, the emergency valve 144 and the second feed valve 132 are opened manually, and the liquid 26 coming from the reserve 96 feeds the casing 38 by flowing into the first control compartment 82, thereby short-circuiting the two float valves 140, 142.

The overflows 112, 114 and the siphons 108, 110 allow the liquid 26 to be discharged towards the recovery tank 94, when a malfunction occurs involving excess liquid 26 in the limitation device 10.

The filling valve 138 is normally open. It is closed manually in the event of the limitation device 10 being forcibly supplied with liquid 26 to ensure that the limitation device 10 operates properly.

The emergency valve 144 is used for manual control of the installation. A console for manually controlling the limitation device 10 is installed outside the containment enclosure 2. This console has visual indicators showing the levels of liquid 26 in the limitation device 10. It enables remote handling of all the manual valves 138, 144, 130 and 132 associated with the limitation device 10 as a function of the level indications.

The supply of liquid 26 to the limitation device 10 may be summarized in the following table:

| | Source | Emergency valve 144 | Second feed valve 132 | Filling valve 138 | First feed valve 130 |
|---|---|---|---|---|---|
| Control by float valves 140 and 142 | Reserve 96 | Closed | Closed | Open | Closed |
| | Feed pipe 102 | Open | Closed | Closed | Open |
| Forcible supply | Reserve 96 | Open | Open | Open | Closed |
| | Feed pipe 102 | Closed | Open | Closed | Open |

The limitation device 10 also comprises a retention tank 98 (see FIGS. 4 and 6), which is located under the casing 38, and the capacity of which is equal to the volume of liquid 26 in the limitation device 10.

As shown in FIGS. 2 and 4, the limitation device 10 comprises a fireproof shield 20, constituted by a enclosure of plaster panels, arranged around the casing 38 and anchored to the support bulkhead. This fireproof shield 20 is fitted with openings 202 which are arranged opposite the openings 36 of the tank 28 and vertical thereto. It provides fire sectoring continuity for the storage bin 4 as far as the openings 36 allowing gases to be discharged towards the containment enclosure 2. It is fitted with a fire door block (not shown) allowing access to the casing 38 for maintenance purposes. It also has a wall feed through 204 providing a passage for the vent 88 of the second control compartment 84.

The operation of the limitation device 10 will now be described with reference to FIGS. 9 and 10, 11 and 12, 13 and 14, which show respectively the two control compartments 82 and 84 in transverse cross-section in elevation, and the external 52 and internal 54 chambers in longitudinal vertical cross-section, in the respective situations of normal operation, first fire phase and second fire phase.

In the normal operation (FIGS. 9 and 10), the limitation device 10 guarantees the containment of the storage bin 4. Indeed, the presence of liquid 26 over the separation elements 50 delimiting the external chambers 52 of the internal chamber 54, seals the storage bin 4 at the level of the limitation device 10.

When a fire occurs, the limitation device 10 previously described operates autonomously in the following way.

During the first phase 200 of the fire (FIGS. 11 and 12), corresponding to the development of a mass fire that is not brought under control in the storage bin 4, the pressure and the temperature increase very significantly. The internal chamber 54 of the tank 28 is in communication with the storage bin 4 on fire via the flue pipe 46, consequently the pressure increases very significantly therein. The level of liquid 26 of the internal chamber 54 drops to the level of the wave breaker plates 56 located at the ends of the separation elements 50. When the pressure in the internal chamber 54 reaches the threshold triggering pressure p_ech, the hot combustion gases pass under the wave breaker plates 56 (arrows 310), and form large gas bubbles. During their rise to the surface of the external chambers 52, the large bubbles are fractionated into very small bubbles 300 via the bubble fractionation devices 58. The small bubbles 300 rise to the free surface and the gases contained in these small bubbles 300 escape towards the containment enclosure 2 (arrows 320). The level of liquid 26 in the first control compartment 82 which controls the internal chamber 54 drops and consequently, the first float valve 140 opens. The second float valve 142 is closed since the level of liquid 26 rises in the external chambers 52. The second float valve 142 only opens when the level of liquid 26 in the second control compartment 84 which controls the external chambers 52 drops following the consumption of liquid 26 by evaporation. Consequently, the liquid level control system 80 is set in motion and the limitation device 10 is supplied with liquid 26. The emergency valve 144 and the second feed valve 132 can be manually opened from a distance in order to supply the tank 28 with liquid 26, following an inspection of the indicators showing the level of liquid 26 in the manual control console.

The limitation device 10 is triggered autonomously for a threshold pressure p_ech, below the "safety pressure" $P_S$ of the containment components of the storage bin 4. This pressure threshold is determined at construction as a function of the chamber surface parameters "S" and "s", and it can be adjusted by the level of filling with liquid 26 in the tank 28. The combustion gases are cooled through bubbling in the external chambers 52, to a temperature below the threshold re-ignition temperature, thereby preventing the fire from spreading to the containment enclosure 2. The significant rate of renewal of ventilation in the containment enclosure 2, relative to the volume of gas being discharged from the limitation device 10 dilutes the gases. The ventilation system 12, 14, 16, 18 of the containment enclosure 2 maintains the dynamic containment and treats the atmosphere in the containment enclosure 2 by setting up in particular one final filtration barrier 16 before the discharge into the external environment 8.

During the second phase 208 of the fire (FIGS. 13 and 14), corresponding to a fire extinction phase, the temperature and pressure drop very significantly, the pressure reaching very high negative values. As soon as the storage bin 4 is at negative pressure, the internal chamber 54 and the first control compartment 82 which controls this internal chamber 54, in communication with the storage bin 4, are also at negative pressure. As soon as the negative pressure in the internal chamber 54 reaches the threshold p_adm, the limitation device 10 operates in a totally reversible way. The fresh air coming from the containment enclosure 2 (arrows 410) passes under the wave breaker plates 56 of the external chambers 52 (arrows 420), and air bubbles 400 are formed which rise to the surface of the liquid 26 of the internal chamber 54 in order to be introduced into the storage bin 4 thereby limiting the negative pressure in the storage bin 4 to a negative pressure below the safety negative pressure: $-P_S$. The levels of liquid 26 in the internal chamber 54 and in the first control compartment 82 in communication with this internal chamber 54 rise, the first float valve 140 is closed, and consequently, the liquid feed system 80 is not triggered. The input of fresh air may then generate a re-ignition in respect of which the limitation device 10 remains available and effective.

An accidental draining of the two siphons 108, 110 represents the failure mode most prejudicial to the limitation device 10, since it results in a loss of pressure difference between the two control compartments 82, 84, and therefore between the internal 54 and external 52 chambers.

An embodiment variant of the siphon arrangement, which overcomes an accidental draining of this type, is shown in FIG. 15.

According to this embodiment variant, a first and second siphon 182, 184 are built into the control compartments 82, 84, respectively, replacing the overflows 112, 114 of the siphons 108, 110 and the feed pipe 106 of the siphons 108, 110. They ensure, in an integrated way, the overflow functions of each of the control compartments 82, 84. Integrating the siphons makes it possible to guarantee that they are not dewatered.

One of the ends 186 of the first siphon 182 opens below the nominal level 194 of liquid 26 in the first control compartment 82. The other end 188 of the first siphon 182 is connected to an outlet pipe 198 towards the recovery tank 94. One of the ends 190 of the second siphon 184 opens below the nominal level 196 of liquid 26 in the second control compartment 84. The other end 192 of the second siphon 184 is connected to the outlet pipe 198. An anti-priming pipe 170 connects the two siphons 182, 184 by connecting to their respective upper parts.

These two siphons 182, 184 are filled by the presence of liquid 26 in the tank 28, which is itself guaranteed by the operation of the float valves 140, 142, and by the fact that the free ends 186, 190 of the two siphons 182, 184 emerge below the respective nominal level 194, 196 of the control compartments 82, 84, and above the bubbling level 172. The presence of the anti-priming pipe 170 makes it possible to stop the siphons 182, 184 from emptying as far as these free ends 186, 190, respectively.

In FIG. 15 are also shown the maximum level 174 of liquid before it overflows into the siphons 182, 184 which also have an overflow function, and the level 176 of liquid 26 in the control compartments 82, 84, the first control compartment 82 being in an intake phase and the second control compartment 84 being in a discharge phase.

Embodiment Example

The different components of the limitation device 10 are normally designed on the basis of an envelope evaluation of the maximum thermodynamic conditions of a mass fire that is not brought under control in a storage bin 4. This preliminary study sets the triggering pressure thresholds p_ech and p_adm of the limitation device 10 and the outflow that has to be discharged by the limitation device 10 in order to maintain the pressure of the storage bin 4 at a pressure below the "safety pressure" $P_S$ of the containment components, in other words the fire dampers, lock chambers, bulkheads.

A design example is provided below, considering a mass fire with very slow kinetics, which may be the case for waste packaged in metal drums.

safety pressure $P_S$ of the containment components: 2,100 Pa volume of the containment enclosure 2: 15,000 m$^3$ volume of the storage bin 4: 3,100 m$^3$ rate of renewal of ventilation: 2 Volumes/hr triggering pressure of the limitation device 10, 11, during the first phase 200 of development of the fire: 1,800 Pa triggering pressure of the limitation device 10, 11 during the intake phase: −1,800 Pa theoretical outflow of gases discharged from the storage bin 4: 2,000 m$^3$/h theoretical temperature of gases discharged from the bin 1: 550° C.

height of casing 38 (or of tank 28): 1.2 m width of casing 38 (or of tank 28): 0.9 m length of casing 38: 1.65 m volume of liquid in the limitation device 10, 11: 0.6 m$^3$ diameter of flue pipe: 400 mm sum S of the surfaces of the external chambers 52: 0.6 m$^2$ widths of the separation elements 50: identical to those of the edges of the openings 36 internal dimensions of each external chamber: 300 mm×500 mm thickness of separation elements: 5 mm height of separation elements: 900 mm distance of immersion into liquid 26 of the ends of the separation elements 50: 90 mm at equal pressure between the internal chamber 54 and the external chambers 52 (for a triggering pressure of 1800 Pa)

thickness of layers of intermeshed metal wires for the bubble fractionation devices 58 and for the anti-splash devices 64: 48 mm per device diameter of the intermeshed metal wires for the bubble fractionation devices 58 and for the anti-splash devices 64: 0.1 mm dimensions of the meshes of the holding grids for the bubble fractionation devices 58: square meshes with sides of between 1 cm and 3 cm dimensions of the meshes of the holding grids for the anti-splash devices 64: square meshes of 25 m×25 mm thickness of the wave breaker plates 56: 5 mm width of the wave breaker plates 56: 30 mm width of the spacers 68: 1 to 2 cm height of the control compartments 82, 84: 1200 mm width of the control compartment 82, 84: 450 mm length of the control compartment: 200 mm diameter of each overflow 112, 114: 30 mm length of each siphon 108, 110: greater than 300 mm diameter of the first aeration orifice 86: 10 mm diameter of the first communication orifice 90: 50 mm diameter of the second aeration orifice 86: 10 mm diameter of the second communication orifice 90: 50 mm volume of the retention tank of 98: 0.6 m$^3$ thickness of the additional layer, 156: 2 cm duration of the firewall guaranteed by the presence of the additional layer 156: 2 hours

The invention claimed is:

1. Device located in a closed containment enclosure surrounding a storage bin for limiting the ultimate consequences of a mass fire that is not brought under control in said storage bin comprising a closed tank positioned on said storage bin in said closed containment enclosure with said tank including at least one opening therein in communication with the closed containment enclosure and a source of non-flammable liquid, an internal chamber for providing direct communication between said tank and said storage bin via a flue pipe, at least one external chamber for providing direct communication between said tank and said containment enclosure via at least said one opening in said tank, and with said device further comprising a fireproof shield enclosing said tank, and a liquid level control system for controlling the level of said nonflammable liquid in said tank, and wherein said tank further comprises:

an upper wall, a lower wall, lateral walls, a plurality of openings, and separation elements extending from each opening at a location approximate said upper wall to a location a predetermined distance above said lower wall, with said separation elements defining said internal chamber, and said at least one external chamber and with each external chamber having a surface corresponding to a surface of each opening in the tank.

2. Device according to claim 1 wherein the internal and external chambers of said tank, said closed containment enclosure and said storage bin satisfy the following relationship with respect to said device:

$$\frac{s}{S} = \frac{p\_adm}{p\_ech}$$

where:

s is the surface of the internal chamber,

S is the sum of the surfaces of each of the external chambers with each surface corresponding to the surface of each opening in the tank, p_adm is the pressure at which the device triggers the intake of gases into the storage bin from the containment enclosure, and p_ech is the pressure at which the device triggers the discharge of gases from the storage bin to the containment enclosure.

3. Device according to claim 1 wherein said separation elements are four in number for each opening in the tank.

4. Device according to claim 1 wherein said tank further comprises four external chambers.

5. Device according to claim 1 wherein said separation elements are fitted with wave breaker devices formed by metal plates anchored to the separation elements which are orientated towards the inside of said at least one external chamber.

6. Device according to claim 5, further comprising at least one bubble fractionation device associated with each external chamber.

7. Device according to claim 6, wherein each bubble fractionation device comprises superimposed layers of intermeshed wires, with said layers being separated from each other by holding grids.

8. Device according to claim 6, characterised in that each bubble fractionation device is anchored to a wave breaker device by means of spacers.

9. Device according to claim 6, wherein said device is anchored to a support bulkhead which is a leak tight bulkhead forming a constituent part of said storage bin.

10. Device according to claim 9, characterised in that said flue pipe provides communication between said storage bin and said internal chamber by passing through said support bulkhead.

11. Device according to claim 9, wherein said fireproof shield is formed of plaster panels anchored to said support bulkhead.

12. Device according to claim 1, characterised in that the liquid level control system comprises:

a first control compartment, which communicates with the tank underneath the free surface of the liquid and which communicates with the storage bin above the free surface of the liquid so as to be at the same pressure as the storage bin, a second control compartment, which communicates with the tank underneath the free surface of the liquid and which communicates with the containment enclosure above the free surface of the liquid so as to be at the same pressure as the containment enclosure, a first float valve, placed in said first control compartment and closed in normal operation, and a second float valve, placed in said second control compartment and open in normal operation, and in that said tank is supplied with liquid when said two float valves are open simultaneously.

13. Device according to claim 12, characterised in that said first control compartment comprises an aeration orifice directly connected to the flue pipe, by means of which said first control compartment is at the same pressure as said storage bin.

14. Device according to claim 12, characterised in that said second control compartment comprises a vent directly connected to said containment enclosure, by means of which said second control compartment is at the same pressure as said containment enclosure.

15. Device according to claim 12, characterised in that said liquid level control system additionally comprises an emergency valve intended for manual operation of said system.

16. Device according to claim 12, characterised in that each control compartment comprises an overflow fitted with a siphon, allowing the liquid to be discharged towards a recovery tank.

17. Device according to claim 12, characterised in that it additionally comprises a reserve of liquid, a filler pipe feeding the tank from the reserve, and an outlet pipe.

18. Device according to claim 1, characterised in that the chambers are made of stainless steel.

19. Device according to claim 1, characterised in that the liquid contained in said tank is water.

* * * * *